Patented Oct. 18, 1932

1,883,395

UNITED STATES PATENT OFFICE

WILLIAM H. MOSS, OF CUMBERLAND, MARYLAND, ASSIGNOR TO CELANESE CORPORATION OF AMERICA, OF NEW YORK, N. Y., A CORPORATION OF DELAWARE

COATING COMPOSITION AND VEHICLE FOR THE SAME

No Drawing.   Application filed October 31, 1927. Serial No. 230,187.

This invention relates to a coating composition containing derivatives of cellulose and particularly to a new and improved vehicle for the same.

An object of my invention is to provide a coating composition containing derivatives of cellulose and particularly organic derivatives of cellulose, that is clear and that produces clear films.

A further object of my invention is to provide a low boiling solvent for lacquer containing organic derivatives of cellulose which solvent produces clear solutions and which is comparatively inexpensive. Other objects of my invention will appear in detailed description.

The preparation of a lacquer containing organic derivatives of cellulose and particularly cellulose acetate as a main constituent of the lacquer base, which lacquer is to be applied to a hard smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced from it become cloudy. I have found that certain synthetic resins, of the phenol-aldehyde or acetone-phenol type, and particularly those formed in the presence of acid catalysts, are compatible with cellulose acetate and that when added to lacquers containing cellulose acetate, form clear solutions that upon drying, produce clear and firmly adherent films. Moreover, appreciable amounts of natural gums or resins may be added to the lacquers containing cellulose acetate and the synthetic resins without causing cloudiness in the solution or the films produced from it. The uses of the synthetic resins in lacquers containing organic derivatives of cellulose is more fully described in my copending applications #217,536 filed September 3, 1927, and applications No. 227,869, 227,870, and 227,871 filed October 21, 1927.

The selection of a low boiling solvent for a lacquer containing the organic derivatives of cellulose, the necessary resins and plasticizers, presents a difficult problem because of the many properties required of such low boiling solvent when used as a vehicle in such lacquers. The low boiling solvent must be a solvent for all of the non-volatile constituents of the lacquer, it must produce clear solutions and clear films, and it must be relatively inexpensive. When the lacquer is to be applied by spraying, it is necessary that the low boiling solvent be of such nature that when the spray reaches the surface to which it is applied, the evaporation of a volatile constituent should not be of such nature that a clear solution no longer exists.

I have found that a mixture of benzene, ethylene dichloride and ethyl alcohol (either pure or denatured) fulfills all the requirements of a low boiling solvent for lacquers containing organic derivatives of cellulose and the resins as set forth above. Other aromatic hydrocarbons such as toluene may replace in whole or in part the benzene, and other alcohols such as methyl alcohol, may replace a part or all of the ethyl alcohol, while other halides of ethylene, such as ethylene bromide, may be substituted for some or all of the ethylene chloride. While the proportions of the three ingredients may be varied within wide limits, I have found that the proportions of 40% of benzene, 30% of ethylene chloride and 30% of alcohol are the most economical to give a low boiling solvent of the required characteristics.

A lacquer containing the low boiling solvents above specified as a vehicle will contain a derivative of cellulose, a resin, a higher boiling solvent, a plasticizer and may or may not contain any desired pigment or filler. The organic derivative of cellulose may be one or more cellulose esters such as cellulose nitrate, cellulose acetate, cellulose formate, cellulose propionate, or cellulose butyrate, or cellulose ethers, such as methyl cellulose, ethyl cellulose or benzyl cellulose. The higher boiling solvents may be one or more of the following: ethyl lactate, diacetone alcohol, tetrachlorethane, and benzyl alcohol. The resin may be a synthetic resin of the phenol-aldehyde type prepared in the presence of an acid catalyst or of the acetone-phenol type as set forth above, to which may or may not be added a natural resin, such as dammar, ester gums (glycerol esters of resin), kauri, manila, pontianak, sandarac, copals, etc. Examples of plasticizers or softeners that may be used are triacetin, diethyl phthalate, tricresyl phosphate, triphenol phosphate, thiocarbanilide, chlornaphthelene, etc.

As an illustration of a lacquer containing the low boiling solvents made in accordance with my invention, the following examples are given:

*Example I*

| | Parts |
|---|---|
| Cellulose acetate | 10 |
| Ethyl alcohol | 30 |
| Ethylene dichloride | 30 |
| Benzene | 40 |

*Example II*

| | Parts |
|---|---|
| Cellulose acetate | 10 |
| Synthetic resin | 10 |
| Ethyl alcohol | 30 |
| Ethylene dichloride | 30 |
| Benzene | 40 |

*Example III*

| | Parts |
|---|---|
| Cellulose acetate | 5 |
| Synthetic resin | 15 |
| Ester gum | 5 |
| Triacetin | 10 |
| Lithopone | 10 |
| Diethyl phthalate | 5 |
| Ethyl alcohol | 30 |
| Ethylene dichloride | 30 |
| Benzene | 40 |
| Benzyl alcohol | 5 |

It is to be understood that the foregoing details are given merely by way of illustration and that many variations may be made therein without departing from the spirit of my invention.

Having described my invention, what I claim and desire to secure by Letters Patent is:

1. A vehicle for a lacquer containing organic derivatives of cellulose comprising substantially 30% of ethyl alcohol, substantially 40% of benzene, and substantially 30% of ethylene dichloride.

2. A lacquer containing esters of cellulose and a low boiling solvent containing alcohol 30%, benzene 40% and ethylene dichloride 30%.

3. A lacquer containing organic derivatives of cellulose and a low boiling solvent containing alcohol 30%, benzene 40%, and ethylene dichloride 30%.

4. A lacquer containing cellulose acetate and a low boiling solvent containing alcohol 30%, benzene 40%, and ethylene dichloride 30%.

5. A lacquer in accordance with claim 4, said lacquer containing a synthetic resin, a plasticizer, and a higher boiling solvent.

In testimony whereof, I have hereunto subscribed my name.

WILLIAM H. MOSS.